Patented Apr. 2, 1929.

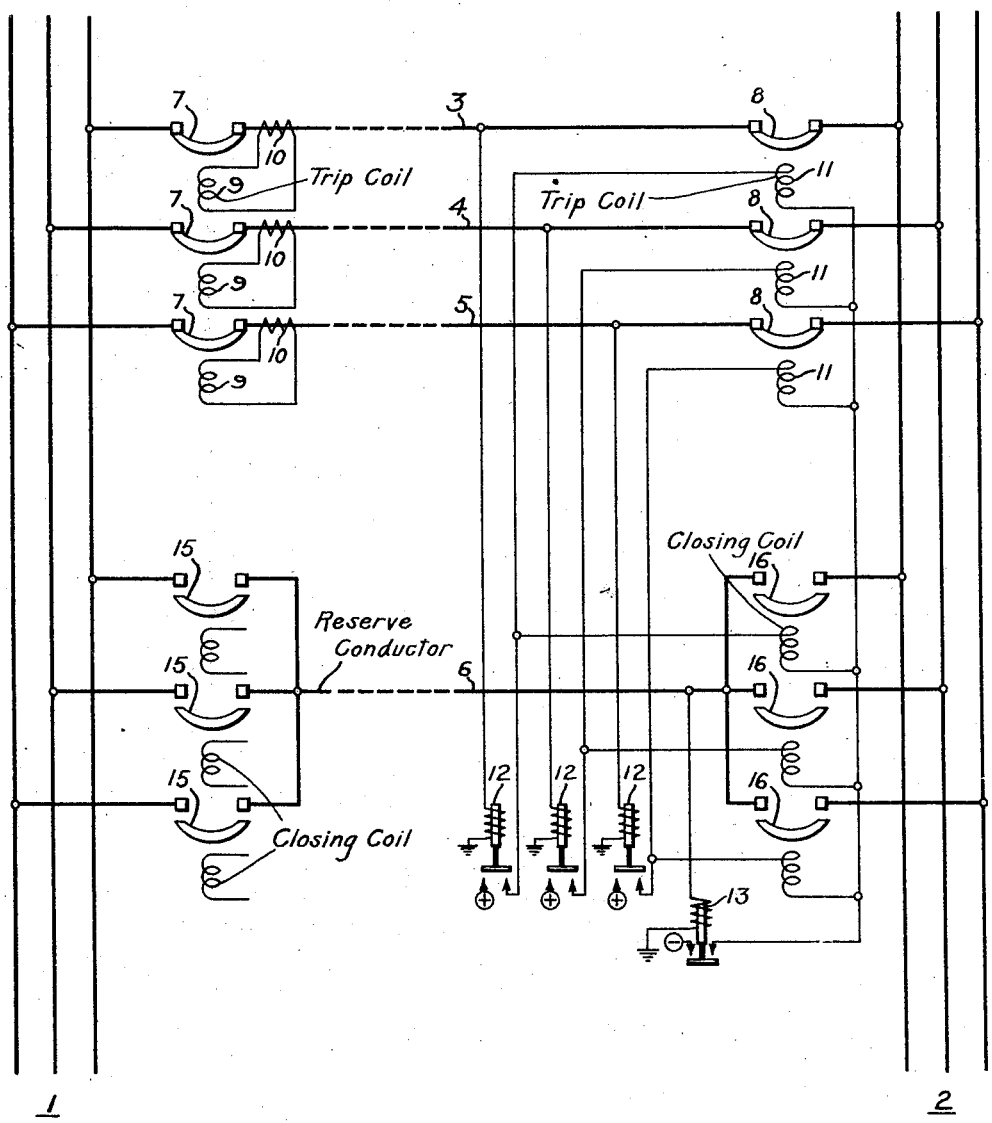

1,707,269

UNITED STATES PATENT OFFICE.

WALTHER KOCH, OF BERLIN, GERMANY, ASSIGNOR TO WESTINGHOUSE ELECTRIC & MANUFACTURING COMPANY, A CORPORATION OF PENNSYLVANIA.

ELECTRICAL DISTRIBUTION SYSTEM.

Application filed July 27, 1926, Serial No. 125,258, and in Germany August 6, 1925.

My invention relates to electrical distribution systems and particularly to switching means for such systems.

An object of my invention is to provide an electrical distribution system having a reserve conductor with means for connecting the reserve conductor in service when a fault obtains.

In such systems as radial distribution systems to which my invention may be applied, the excessive current flowing to a fault may be utilized to disconnect a faulty conductor and to connect the supply end of the reserve conductor in its place. The other end of the faulty conductor, however, is not traversed by an excessive current, and different means for substituting the reserve conductor must be employed.

In accordance with my invention, the reserve conductor is connected at the generator or supply end of the system by any usual means, such as that described above operating in response to the fault current. The energization of the reserve conductor is then utilized to connect the other or substation end thereof to the system.

For a better understanding of my invention, reference should be had to the accompanying drawing, the single figure of which is a diagrammatic view of a system embodying my invention.

Referring to the drawing, an electrical distribution system is shown comprising a three-phase supply bus 1 and a three-phase load bus 2 connected thereto through the main conductors 3, 4 and 5, respectively. A reserve conductor 6 also extends between the supply and load buses, and switching means is provided for connecting this reserve conductor in place of any one of the main conductors in case a fault develops thereon. As indicated, the supply bus 1 may be located in a generating station and the load bus 2 in a substation.

A plurality of individual switches 7 in the transmission conductors are provided at the generator end of the distribution circuit and a plurality of similar switches 8 are provided at the substation end of the circuit. The switches 7 are normally closed and are arranged to be tripped upon the occurrence of a fault by any suitable means, such as a tripping coil 9 and a current transformer 10 in series with the associated main conductor. The switches 8 are also normally closed but are arranged to be operated by tripping coils 11 under the control of auxiliary relays 12 and 13.

The reserve conductor 6 is provided with three normally open switches 15, in the case of a three-phase circuit, to connect the conductor to any one of the supply bus bars. The switches 15 are automatically operated upon the tripping of one of the switches 7 in any suitable manner, such as by means of an auxiliary switch on the switch 7 for closing a circuit through the operating coil of the corresponding switch 15 when the switch 7 is in the open position. The several switches 7 and 15 are thus so related that, when one of the switches 7 opens, the corresponding bus bar is automatically connected, through one of the switches 15, to the reverse conductor 6. As this detail of the system is well known, the specific operating circuits are omitted from the drawing for the sake of simplicity.

A plurality of switches 16 are also provided at the other end of the reserve conductor 6 to connect the conductor to any desired one of the bus bars in the substation. The switches 16 are operated by the auxiliary relays 12 and 13. The several relays 12 are connected between the respective main conductors 3, 4 and 5 and ground. When one of the main conductors is disconnected by the operation of one of the switches 7, the associated relay 12 becomes de-energized and closes its contact members.

After the reserve conductor 6 is connected through one of the switches 15 to the supply bus bar, as described above, the relay 13, connected between the conductor 6 and ground, becomes energized. A circuit is then closed through the contacts of relays 12 and 13 and the tripping coil of one of the switches 8 to disconnect the faulty conductor 3, 4 or 5. A circuit is also closed through the closing coil of one of the switches 16 to connect the reserve conductor 6 to the corresponding bus bar in the substation.

It will be apparent that I have devised a simple and effective system for connecting the reserve conductor in service in radial distribution systems in which the substation bus is de-energized after one of the main distribution circuits is opened at the generating station. In the case of a three-phase system, such as that illustrated, only four auxiliary relays are required.

I am aware that changes in the specific arrangement which I have shown will occur to those skilled in the art and, accordingly, I desire that the invention shall not be limited in scope except as indicated in the appended claims.

I claim as my invention:

1. In an electrical distribution system, a plurality of main conductors, a reserve conductor, means responsive to a fault in one of said main conductors for disconnecting one end thereof, means responsive to said disconnection for substituting said reserve conductor for the faulty main conductor, and means responsive to the energization of said reserve conductor for disconnecting the other end of said main conductor.

2. An electrical distribution system comprising supply and load busses, a plurality of main conductors connecting said busses, a reserve conductor, switching means responsive to a fault in one of said main conductors for disconnecting said conductor from the respective supply bus, means responsive to said disconnection for connecting one end of said reserve conductor to said bus, and switching means responsive to energization of said reserve conductor for disconnecting the opposite end of said main conductor from said load bus and connecting the opposite end of said reserve conductor to said load bus.

In testimony whereof, I have hereunto subscribed my name this first day of July, 1926.

WALTHER KOCH.